United States Patent
Ali et al.

(10) Patent No.: US 10,459,812 B2
(45) Date of Patent: *Oct. 29, 2019

(54) SEAMLESS METHOD FOR BOOTING FROM A DEGRADED SOFTWARE RAID VOLUME ON A UEFI SYSTEM

(71) Applicant: DELL PRODUCTS, LP, Round Rock, TX (US)

(72) Inventors: Ahmad A. J. Ali, Austin, TX (US); Charles E. Rose, Nashua, NH (US)

(73) Assignee: Dell Products, LP, Round Rock, TX (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/402,494

(22) Filed: Jan. 10, 2017

(65) Prior Publication Data

US 2017/0132098 A1   May 11, 2017

Related U.S. Application Data

(63) Continuation of application No. 14/333,232, filed on Jul. 16, 2014, now Pat. No. 9,569,297.

(51) Int. Cl.
| | |
|---|---|
| *G06F 11/00* | (2006.01) |
| *G06F 11/20* | (2006.01) |
| *G06F 11/07* | (2006.01) |
| *G06F 9/4401* | (2018.01) |
| *G06F 11/10* | (2006.01) |

(52) U.S. Cl.
CPC ........ *G06F 11/2064* (2013.01); *G06F 9/4408* (2013.01); *G06F 11/073* (2013.01); *G06F 11/079* (2013.01); *G06F 11/0727* (2013.01); *G06F 11/0763* (2013.01); *G06F 11/1004* (2013.01); *G06F 11/20* (2013.01); *G06F 2201/805* (2013.01); *G06F 2201/82* (2013.01)

(58) Field of Classification Search
CPC ...................................................... G06F 11/079
See application file for complete search history.

(56) References Cited

U.S. PATENT DOCUMENTS

| | | |
|---|---|---|
| 6,775,236 B1 | 8/2004 | Scrandis et al. |
| 7,917,762 B2 | 3/2011 | Lewis et al. |
| 8,356,194 B2 | 1/2013 | Carlson et al. |
| 8,423,718 B2 | 4/2013 | Tsai et al. |
| 8,589,902 B2 | 11/2013 | Jones et al. |
| 8,914,627 B2 | 12/2014 | Park et al. |
| 2006/0047945 A1* | 3/2006 | Brandenberger ... G06F 11/1433 713/2 |
| 2006/0155784 A1 | 7/2006 | Kusters et al. |
| 2007/0136807 A1 | 6/2007 | DeLiberato et al. |
| 2009/0089570 A1 | 4/2009 | Andrianov |

(Continued)

OTHER PUBLICATIONS

Microsoft Computer Dictionary, Microsoft Press, 4th Ed. 1999, p. 474.

*Primary Examiner* — Christopher S McCarthy
(74) *Attorney, Agent, or Firm* — Larson Newman, LLP

(57) ABSTRACT

An information handling system includes a processor and a configuration detection and error handling module operable to read a first tag data file from a first storage volume, read a second tag data file from a second storage volume, and determine that the first storage volume and the second storage volume are configured as mirrored storage volumes based upon the first tag data file and the second tag data file.

18 Claims, 4 Drawing Sheets

(56) References Cited

U.S. PATENT DOCUMENTS

| | | |
|---|---|---|
| 2010/0235615 A1 | 9/2010 | Manczak et al. |
| 2011/0185203 A1 | 7/2011 | Carlson et al. |
| 2011/0252001 A1 | 10/2011 | Bensinger |
| 2012/0117367 A1 | 5/2012 | Lu et al. |
| 2012/0210115 A1 | 8/2012 | Park et al. |
| 2013/0219380 A1 | 8/2013 | Rogers et al. |
| 2014/0330784 A1 | 11/2014 | Sundaram et al. |
| 2015/0033067 A1* | 1/2015 | Ludwig .............. G06F 11/2069 714/6.23 |
| 2015/0220319 A1 | 8/2015 | Weiss et al. |
| 2015/0370576 A1 | 12/2015 | Wynn |
| 2015/0378846 A1 | 12/2015 | Hagiwara et al. |

* cited by examiner

SEAMLESS METHOD FOR BOOTING FROM A DEGRADED SOFTWARE RAID VOLUME ON A UEFI SYSTEM

CROSS-REFERENCE TO RELATED APPLICATION

This application is a continuation of U.S. patent application Ser. No. 14/333,232, entitled " Seamless Method for Booting from a Degraded Software Raid Volume on a UEFI System," filed on Jul. 16, 2014, the disclosure of which is hereby expressly incorporated by reference in its entirety.

FIELD OF THE DISCLOSURE

This disclosure relates generally to information handling systems, and more particularly related to booting from a degraded software RAID volume on a Unified Extensible Firmware Interface (UEFI) system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system. A redundant array of independent disks (RAID) storage volume combines multiple storage devices into a logical device for data storage redundancy.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
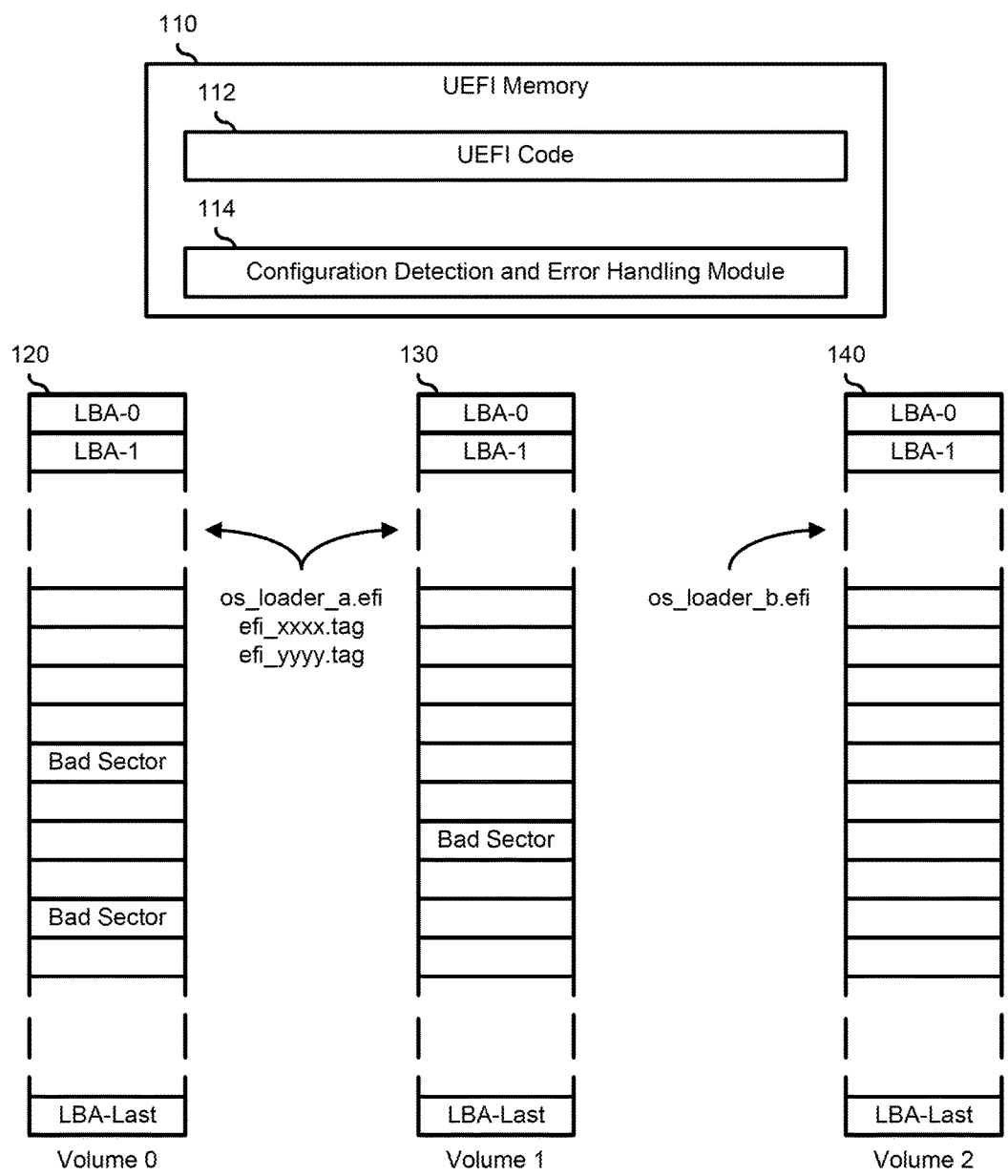
FIG. 1 is a block diagram of an information handling system according to an embodiment of the present disclosure.

FIG. 1 illustrates an information handling system 100 including a Unified Extensible Firmware Interface (UEFI) memory 110, and storage volumes 120, 130, and 140. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

UEFI memory 110 includes UEFI code 112 for booting and operating information handling system 100, and code for implementing a configuration detection and error handling (configuration/error) module 114. In a particular embodiment, UEFI memory 110 is a non-volatile random access memory (NV-RAM), such as a flash memory device. Storage volumes 120, 130, and 140 represent bootable storage media that are accessible to UEFI code 112 for storage and retrieval of information including data and executable code. The skilled artisan will recognize that storage volumes 120, 130, and 140 can represent individual data storage devices, such as disk drives, USB storage devices, or other data storage devices, can represent logical partitions of one or more individual storage devices, or a combination thereof. In a particular embodiment, storage volumes 120, 130, and 140 are configured according to a Globally Unique Identifier (GUID) Partition Table (GPT) format, and the data included in the storage volumes are stored on partitions that are configured according to one or more of a FAT12, a FAT16, and a FAT32 variant of a File Allocation Table (FAT) format.

Storage volumes 120, 130, and 140 each represent boot volumes for information handling system 100. As such, storage volumes 120 and 130 each include an executable file named os_loader_a.efi that includes executable code for implementing a boot loader for a particular operating system, and storage volume 140 includes an executable file named os_loader_b.efi that includes executable code for implementing a boot loader for a different operating system. Storage volumes 120 and 130 also include tag data files named efi_xxxx.tag and efi_yyyy.tag. Storage volumes 120 and 130 are configured as mirrored (RAID 1) storage volumes, and storage volume 140 is configured as a stand-alone storage volume.

In operation, configuration/error module 114 determines that storage volumes 120 and 130 are configured as RAID 1 storage volumes by determining that the matching tag data files efi_xxxx.tag and efi_yyyy.tag are both present on storage volumes 120 and 130. Here, configuration/error module 114 first detects boot volumes for information handling system 100, and having detected that storage volumes 120, 130, and 140 are all boot volumes, proceeds to look for the presence of tag data files on the storage volumes. For example, configuration/error module 114 can search for files with the extension ".tag," or for some other extension, as needed or desired.

When all of the tag data files are found, configuration/error module 114 further operates to compare the tag data files to determine if any of storage volumes 120, 130, and 140 include the same tag data files. If so, then configuration/error module 114 identifies the storage volumes that share common tag data files as being configured in a RAID 1 configuration. For example, because storage volumes 120 and 130 each include the same tag data files, configuration/error module 114 identifies the storage volumes to be configured in a RAID 1 configuration. If a particular storage volume does not include any tag data files, the that storage volume is a standalone storage volume. For example, because only storage volume 140 includes no tag files, configuration/error module 114 identifies storage volume 140 as being a standalone storage volume.

Figure 2:
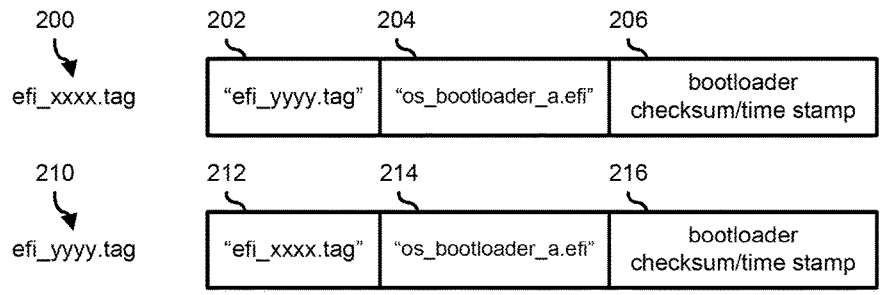
FIG. 2 is a block diagram illustrating tag data files of FIG. 1.

FIG. 2 illustrates an embodiment of tag data files 200 and 210. Here tag data file 200 is named efi_xxxx.tag and tag data file 210 is named efi_yyyy.tag. Tag data file 200 includes a complimentary tag data file name field 202, an OS boot loader name field 204, and an OS boot loader authenticator field 206. Complimentary tag data file name field 202 includes the name of tag data file 210, that is "efi_yyyy.tag," to identify the complimenting tag data file. OS boot loader name field 204 includes the name of the OS boot loader that is associated with the storage volume, that is "os-bootloader_a.efi," to identify the associated boot loader. OS boot loader authenticator field 206 includes information to verify the integrity of the boot loader file. For example, OS boot loader authenticator 206 can include a checksum for the boot loader file, a time stamp for the boot loader, or other information needed to identify the boot loader file, as needed or desired. Tag data file 210 is similar to tag data file 200, and includes a complimentary tag data file name field 212, an OS boot loader name field 214, and an OS boot loader authenticator field 216. Complimentary tag data file name field 212 includes the name of tag data file 200, that is "efi_xxxx.tag," to identify the complimenting tag data file. OS boot loader name field 214 includes the name of the OS boot loader that is associated with the storage volume, that is "os-bootloader_a.efi," and OS boot loader authenticator field 216 includes the information to verify the integrity of the boot loader file.

Returning to FIG. 1, in a first embodiment, in comparing the tag data files included in storage volumes 120, 130, and 140, configuration/error module 114 operates to compare the names of the tag data files. Here, the mere fact that both storage volumes 120 and 130 both include tag data files that share the common names "efi_xxxx.tag" and "efi_yyyy.tag" is sufficient to identify storage volumes 120 and 130 as being configured in a RAID configuration. In another embodiment, in comparing the tag data files included in storage volumes 120, 130, and 140, configuration/error module 114 operates to compare not only the names of the tag data files, but also the contents of the tag data files. For example, where storage volumes 120 and 130 each include tag data files 200 and 210, configuration/error module 114 can determine that tag data file 200 includes the name of tag data file 210, and vice versa. In this way, tag data files 200 and 210 provide for redundancy of the information in the respective OS boot loader name fields 204 and 214, and the OS boot loader authenticator fields 206 and 216, and the tag data files include information to clearly identify their counterparts via respective complimentary tag data file name fields 202 and 212. In a further example, the configuration/error module 114 can determine that both tag data files 200 and 210 include the same OS boot loader name in respective OS boot loader name fields 204 and 214, and the configuration/error module can determine that both of the tag data files include the same information in respective OS boot loader authenticator fields 206 and 216.

In a particular embodiment, once storage volumes 120 and 130 are identified as being configured in a RAID 1 configuration, configuration/error module 114 operates to verify the integrity of the OS boot loader file, os_bootloader_a.efi, by checking the OS boot loader file against one or more of OS boot loader authenticator fields 206 and 216 to verify that the OS boot loader file matches. For example, configuration/error module 114 can check a data stamp on the OS boot loader file and verify that the date stamp matches date stamp information in one of the OS boot loader authenticator fields. In another example, after the OS boot loader file has been read from a RAID volume, configuration/error module 114 can perform a checksum on the OS boot loader file and verify that the checksum matches checksum information in OS boot loader authenticator field 206 or 216.

After storage volumes 120 and 130 are identified as being configured in a RAID 1 configuration, configuration/error module 114 operates to provide for a file read of the OS boot loader file. If, while reading the OS boot loader file, configuration/error module 114 encounters a bad sector in a first element of the RAID volume, the configuration/error module automatically continues the file read of the OS boot loader file at the file offset of the bad sector in the second element of the RAID volume. For example, while reading the OS boot loader file from storage volume 120, configuration/error module 114 can encounter a bad sector read at a location associated with a file offset within the OS boot loader file, and can automatically continue reading the OS boot loader file, beginning at the file offset within the OS boot loader file in storage volume 130. Similarly, if a bad sector read is encountered at another location associated with a subsequent file offset within the OS boot loader file in storage volume 130, configuration/error module 114 can automatically continue reading the OS boot loader file, beginning at the subsequent file offset within the OS boot loader file in storage volume 120. In this way, information handling system 100 operates to boot from a degraded RAID 1 storage volume seamlessly without prior knowledge of configuration of the RAID 1 storage volume.

In a particular embodiment, each storage volume of a RAID 1 configured boot volume stores only one tag data file that includes an OS boot loader name field, and an OS boot loader authenticator field. Here, in a first embodiment, in comparing the tag data file included in the storage volumes, a configuration/error module operates to compare the names of each tag data file from the different volumes. In another embodiment, in comparing the tag data file included in the storage volumes, the configuration/error module operates to compare not only the names of each tag data file, but also the contents of each tag data file. For example, the configuration/error module can determine that the tag data file of each storage volume includes the same OS boot loader name in the respective OS boot loader name fields, and the configuration/error module can determine that the tag data file of each storage volume includes the same information in the respective OS boot loader authenticator fields.

Figure 3:
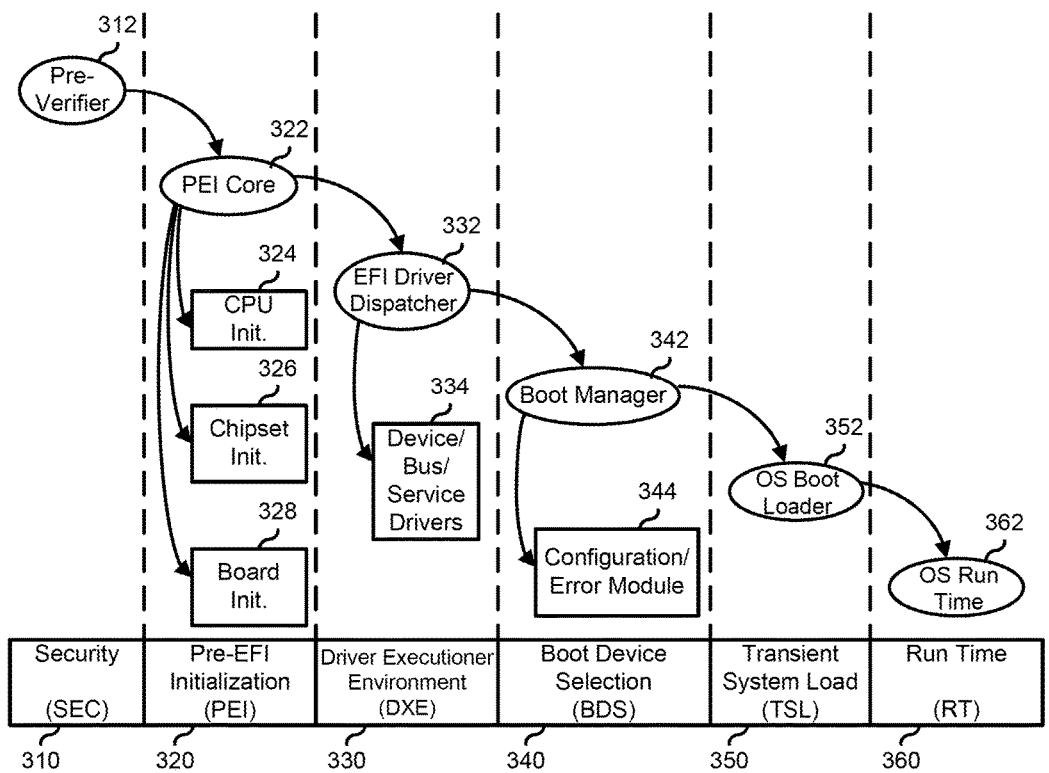
FIG. 3 is a phase diagram for a UEFI boot of the information handling system of FIG. 1.

FIG. 3 illustrates a phase diagram 300 for an information handling system that operates using a UEFI, including a security phase (SEC) 310, a pre-EFI initialization phase (PEI) 320, a driver execution environment phase (DXE) 330, a boot device selection phase (BDS) 340, a transient system load phase (TSL) 350, and a run time phase (RT) 360. SEC 310 is the first phase of a UEFI boot process on the information handling system that operates to set up a pre-verifier 312. Pre-verifier 312 handles all restart events on the information handling system, and temporarily allocates a portion of memory for use during the other boot phases. SEC 310 is executed out of the firmware resident on the information handling system, and so serves as a root of trust for the system.

SEC 310 passes execution to PEI 320 which initializes the system memory for the information handling system. PEI 320 sets up a PEI core 322 that includes CPU initialization 324, chipset initialization 326, and board resource initialization 328. PEI 320 passes execution to DXE 330 which performs device specific initializations for the information handling system. In particular, DXE 330 executes an EFI driver dispatcher 332 that operates to load device, bus, and service drivers 334. DXE 330 passes execution to BDS 340 which executes a boot manager 342 that includes a configuration/error module 344 that operates as described above. In a particular embodiment, a configuration/error module similar to configuration/error module 334 operates in DXE330. Boot manager 342 also identifies a boot target, and passes execution to TSL 350. TSL 350 launches an OS boot loader 352 which loads the operating system, and passes execution to the operating system at RT 360.

Figure 4:
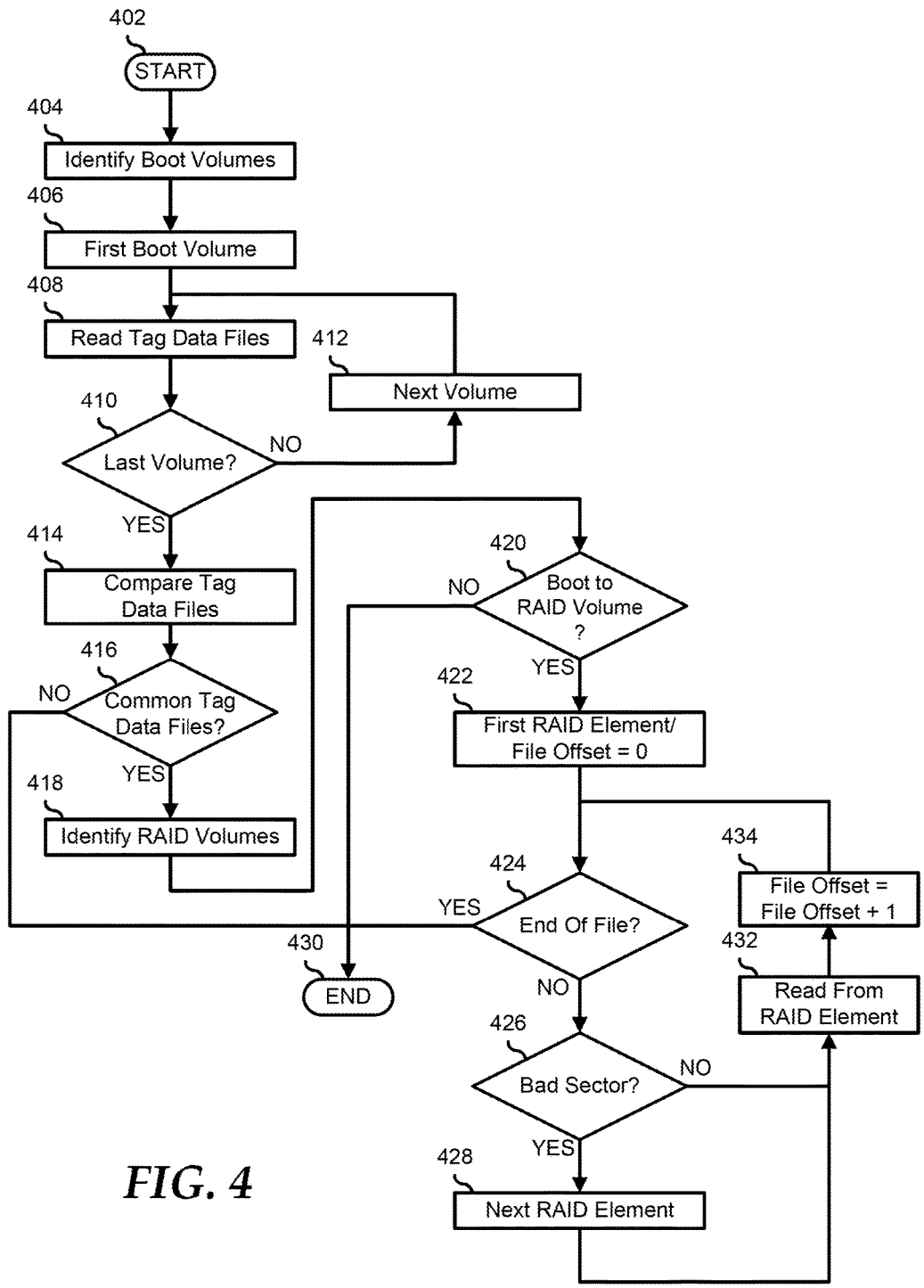
FIG. 4 is a flowchart illustrating a method for booting from a degraded software RAID volume on a UEFI system.

FIG. 4 illustrates a method for booting from a degraded RAID volume on a UEFI system, starting at block 402. A configuration/error module of a UEFI for an information handling system identifies boot volumes in block 404. For example, configuration/error module 114 can determine that storage volumes 120, 130, and 140 are boot volumes. A first boot volume is selected in block 406, and the tag data files are read from the selected boot volume in block 408. For example, configuration/error module 114 can read tag data files 200 and 210 from storage volume 120. A decision is made as to whether or not the selected boot volume is the last boot volume in decision block 410. If not, the "NO" branch of decision block 410 is taken, a next boot volume is selected in block 412, and the method returns to block 408 where the tag data files are read from the newly selected boot volume.

If the selected boot volume is the last boot volume, the "YES" branch of decision block 410 is taken and the tag data files are compared in block 414. For example, the names of the tag data files can be compared, the contents of the tag data files can be compared, or a combination thereof. A decision is made as to whether or not there are any common tag data files among the boot volumes in decision block 416. If not, the "NO" branch of decision block 416 is taken and the method ends in block 432. If there are common tag data files among the boot volumes, the "YES" branch of decision block 416 is taken and the boot volumes that included the common tag data files are identified as being configured as RAID 1 storage volumes in block 418. For example, configuration/error module 114 can identify storage volumes 120 and 130 as being configured in a RAID 1 configuration.

A decision is made as to whether or not the information handling system is to be booted from one of the RAID volumes in decision block 420. If not, the "NO" branch of decision block 420 is taken and the method ends in block 430. If the information handling system is to be booted from one of the RAID volumes, the "YES" branch of decision block 420 is taken, a first storage volume of the RAID volumes is selected and a file offset is set for a first offset in the OS boot file in block 422, and a decision is made as to whether or the selected storage volume and the selected file offset point to the end of the OS boot file in decision block 424. If so, the "YES" branch of decision block 424 is taken and the method ends in block 430.

If the selected storage volume and the selected file offset do not point to the end of the OS boot file, the "NO" branch of decision block 424 is taken and a decision is made as to whether or not the sector in the selected storage volume at the selected file offset is a bad sector in decision block 426. If not, the "NO" branch of decision block 426 is taken, the sector in the selected storage volume at the selected file offset is read in block 432, the file offset within the OS boot file is incremented in block 434, and the method returns to block 424 where the end of file decision is made based upon the new file offset. If the sector in the selected storage volume at the selected file offset is a bad sector, the "YES" branch of decision block 426 is taken, the next storage volume of the RAID volumes is selected in block 428, the sector in the newly selected storage volume at the selected file offset is read in block 432, the file offset within the OS boot file is incremented in block 434, and the method returns to block 424 where the end of file decision is made based upon the new file offset.

Figure 5:
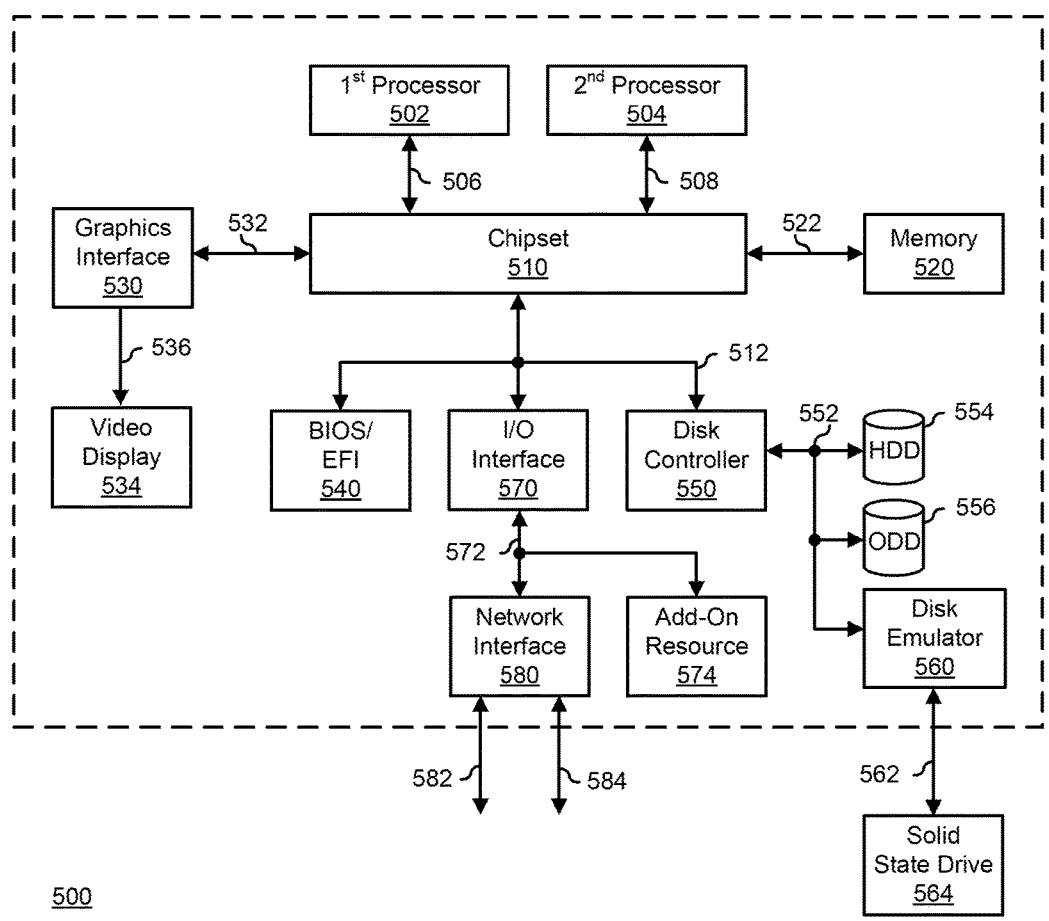
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor; and
   a configuration detection and error handler configured to:
      read a first tag data file from a first storage volume;
      read a second tag data file from a second storage volume;
      determine that the first storage volume and the second storage volume are configured as mirrored storage volumes based upon the first tag data file and the second tag data file;
      read a first sector of the first storage volume;
      determine that the first sector of the first storage volume included bad data; and
      read the first sector of the second storage volume in response to determining that the first sector of the first storage volume included bad data.

2. The information handling system of claim 1, wherein the handler is further configured to:
   compare the first tag data file and the second tag data file;
   wherein the determination that the first storage volume and the second storage volume are configured as mirrored storage volumes is further based upon the comparison of the first tag data file and the second tag data file.

3. The information handling system of claim 2, wherein in comparing the first tag data file and the second tag data file, the handler is further configured to:
   compare a first name of the first tag data file to a second name of the second tag data file;
   wherein the first storage volume and the second storage volume are determined to be configured as mirrored storage volumes when the first name is the same as the second name.

4. The information handling system of claim 2, wherein in comparing the first tag data file and the second tag data file, the handler is further configured to:
   compare the contents of a first OS boot loader name field of the first tag data file to the contents of a second OS boot loader name filed of the second tag data file;
   wherein the first storage volume and the second storage volume are determined to be configured as mirrored storage volumes when the contents of first OS boot loader name field is the same as the contents of second OS boot loader name field.

5. The information handling system of claim 2, wherein in comparing the first tag data file and the second tag data file, the handler is further configured to:
   compare the contents of a first OS boot loader authenticator field of the first tag data file to the contents of a second OS boot loader authenticator filed of the second tag data file;
   wherein the first storage volume and the second storage volume are determined to be configured as mirrored storage volumes when the contents of first OS boot loader authenticator field is the same as the contents of second OS boot loader authenticator field.

6. The information handling system of claim 5, wherein:
   the contents of the first OS boot loader authenticator field includes a first checksum for a first OS boot loader stored on the first storage volume; and
   the contents of the second OS boot loader authenticator field includes a second checksum for a second OS boot loader stored on the second storage volume.

7. The information handling system of claim 5, wherein:
   the contents of the first OS boot loader authenticator field includes a first date stamp for a first OS boot loader stored on the first storage volume; and
   the contents of the second OS boot loader authenticator field includes a second date stamp for a second OS boot loader stored on the second storage volume.

8. The information handling system of claim 1, wherein, after reading the first sector of the second storage volume, the handler is further configured to:
   read a second sector of the second storage volume;
   determine that the second sector of the second storage volume included bad data; and
   read the second sector of the first storage volume in response to determining that the second sector of the second storage volume included bad data.

9. A method comprising:
   reading, by a configuration detection and error handling (configuration/error) module of an information handling system, a first tag data file from a first storage volume;
   reading, by the configuration/error module, a second tag data file from a second storage volume;
   determining, by the configuration/error module, that the first storage volume and the second storage volume are configured as mirrored storage volumes based upon the first tag data file and the second tag data file;
   reading a first sector of the first storage volume after determining that the first storage volume and the second storage volume are configured as mirrored storage volumes;
   determining that the first sector of the first storage volume included bad data; and
   reading the first sector of the second storage volume in response to determining that he first sector of the first storage volume included bad data.

10. The method of claim 9, further comprising:
    comparing the first tag data file and the second tag data file;
    wherein the determination that the first storage volume and the second storage volume are configured as mirrored storage volumes is further based upon the comparison of the first tag data file and the second tag data file.

11. The method of claim 10, wherein in comparing the first tag data file and the second tag data file, the method further comprises:
    comparing a first name of the first tag data file to a second name of the second tag data file;
    wherein the first storage volume and the second storage volume are determined to be configured as mirrored storage volumes when the first name is the same as the second name.

12. The method of claim 10, wherein in comparing the first tag data file and the second tag data file, the method further comprises:
    comparing the contents of a first OS boot loader name field of the first tag data file to the contents of a second OS boot loader name filed of the second tag data file;
    wherein the first storage volume and the second storage volume are determined to be configured as mirrored storage volumes when the contents of first OS boot loader name field is the same as the contents of second OS boot loader name field.

13. The method of claim 10, wherein in comparing the first tag data file and the second tag data file, the method further comprises:

comparing the contents of a first OS boot loader authenticator field of the first tag data file to the contents of a second OS boot loader authenticator filed of the second tag data file;

wherein the first storage volume and the second storage volume are determined to be configured as mirrored storage volumes when the contents of first OS boot loader authenticator field is the same as the contents of second OS boot loader authenticator field.

14. The method of claim 13, wherein:
the contents of the first OS boot loader authenticator field includes a first checksum for a first OS boot loader stored on the first storage volume; and
the contents of the second OS boot loader authenticator field includes a second checksum for a second OS boot loader stored on the second storage volume.

15. The method of claim 13, wherein:
the contents of the first OS boot loader authenticator field includes a first date stamp for a first OS boot loader stored on the first storage volume; and
the contents of the second OS boot loader authenticator field includes a second date stamp for a second OS boot loader stored on the second storage volume.

16. The method of claim 9, wherein, after reading the first sector of the second storage volume, the method further comprises:
reading a second sector of the second storage volume;
determining that the second sector of the second storage volume included bad data; and
reading the second sector of the first storage volume in response to determining that the second sector of the second storage volume included bad data.

17. An information handling system comprising:
a processor; and
a configuration detection and error handler configured to:
read a first tag data file from a first storage volume;
read a second tag data file from a second storage volume;
determine that the first storage volume and the second storage volume are configured as mirrored storage volumes based upon the first tag data file and the second tag data file; and
after determining that the first storage volume and the second storage volume are configured as mirrored storage volumes, to:
read a first sector of the first storage volume;
determine that the first sector of the first storage volume included bad data; and
read the first sector of the second storage volume in response to determining that the first sector of the first storage volume included bad data.

18. The information handling system of claim 17 wherein, after reading the first sector of the second storage volume, the configuration/error module is further configured to:
read a second sector of the second storage volume;
determine that the second sector of the second storage volume included bad data; and
read the second sector of the first storage volume in response to determining that the second sector of the second storage volume included bad data.

* * * * *